US012583176B2

(12) United States Patent
Nauka et al.

(10) Patent No.: US 12,583,176 B2
(45) Date of Patent: Mar. 24, 2026

(54) THREE-DIMENSIONAL PRINTING

(71) Applicant: PERIDOT PRINT LLC, Palo Alto, CA (US)

(72) Inventors: Krzysztof Nauka, Palo Alto, CA (US); Adekunle Olubummo, Palo Alto, CA (US); Kyle Wycoff, Palo Alto, CA (US); Emre Hiro Discekici, San Diego, CA (US)

(73) Assignee: Peridot Print LLC, Palo Alto, CA (US)

( * ) Notice: Subject to any disclaimer, the term of this patent is extended or adjusted under 35 U.S.C. 154(b) by 135 days.

(21) Appl. No.: 18/033,151

(22) PCT Filed: Oct. 29, 2020

(86) PCT No.: PCT/US2020/057982
§ 371 (c)(1),
(2) Date: Apr. 21, 2023

(87) PCT Pub. No.: WO2022/093236
PCT Pub. Date: May 5, 2022

(65) Prior Publication Data
US 2023/0391000 A1 Dec. 7, 2023

(51) Int. Cl.
*B29C 64/165* (2017.01)
*B29C 64/264* (2017.01)
(Continued)

(52) U.S. Cl.
CPC .......... *B29C 64/165* (2017.08); *B29C 64/264* (2017.08); *B33Y 10/00* (2014.12); *B33Y 70/10* (2020.01)

(58) Field of Classification Search
CPC ..... B29C 64/165; B29C 64/264; B33Y 10/00; B33Y 70/10
See application file for complete search history.

(56) References Cited

U.S. PATENT DOCUMENTS

| 2019/0016043 A1 | 1/2019 | Olubummo et al. |
| 2019/0092799 A1 | 3/2019 | Olubummo et al. |
| | (Continued) | |

FOREIGN PATENT DOCUMENTS

| CN | 110023058 A | 7/2019 |
| CN | 110177678 A | 8/2019 |
| | (Continued) | |

OTHER PUBLICATIONS

Karakurta, I., et al., "Stereolithography (SLA) 3D printing of ascorbic acid loaded hydrogels: A controlled release study", ScienceDirect, vol. 584, Jun. 30, 2020, Abstract, 3 pages.

*Primary Examiner* — Edmund H Lee
(74) *Attorney, Agent, or Firm* — Dierker & Kavanaugh, P.C.

(57) ABSTRACT

An example of a kit for three-dimensional (3D) printing includes an ultraviolet (UV) light fusing agent. The ultraviolet (UV) light fusing agent includes an aqueous vehicle and a B vitamin or a B vitamin derivative present in an amount that dissolves in the aqueous vehicle. The aqueous vehicle includes a co-solvent, a surfactant, and water. The B vitamin or the B vitamin derivative has absorption at wavelengths ranging from about 340 nm to about 415 nm.

12 Claims, 7 Drawing Sheets

(51) Int. Cl.
  *B33Y 10/00*         (2015.01)
  *B33Y 70/10*         (2020.01)

(56)                    References Cited

U.S. PATENT DOCUMENTS

| | | |
|---|---|---|
| 2020/0197562 A1 | 6/2020 | Xue et al. |
| 2020/0282642 A1 | 9/2020 | Woodruff et al. |
| 2021/0155722 A1* | 5/2021 | Vaughn ................. G03F 7/0047 |
| 2021/0178466 A1 | 6/2021 | Anthony et al. |
| 2022/0064461 A1 | 3/2022 | Fung et al. |

FOREIGN PATENT DOCUMENTS

| | | | |
|---|---|---|---|
| CN | 111356572 A | | 6/2020 |
| EP | 3137282 B1 | | 8/2018 |
| KR | 10-2013-0077091 A | | 7/2013 |
| TW | 201823356 A | | 7/2018 |
| WO | WO2016175813 | * | 11/2016 |
| WO | 2018/043818 A1 | | 3/2018 |
| WO | 2019/108201 A1 | | 6/2019 |
| WO | 2019/195256 A1 | | 10/2019 |

* cited by examiner

THREE-DIMENSIONAL PRINTING

BACKGROUND

Three-dimensional (3D) printing may be an additive printing process used to make three-dimensional solid parts from a digital model. 3D printing is often used in rapid product prototyping, mold generation, mold master generation, and short run manufacturing. Some 3D printing techniques are considered additive processes because they involve the application of successive layers of material (which, in some examples, may include build material, binder and/or other printing liquid(s), or combinations thereof). This is unlike traditional machining processes, which often rely upon the removal of material to create the final part. Some 3D printing methods use chemical binders or adhesives to bind build materials together. Other 3D printing methods involve at least partial curing, thermal merging/fusing, melting, sintering, etc. of the build material, and the mechanism for material coalescence may depend upon the type of build material used. For some materials, at least partial melting may be accomplished using heat-assisted extrusion, and for some other materials (e.g., polymerizable materials), curing or fusing may be accomplished using, for example, infrared light.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figures 1, 2:
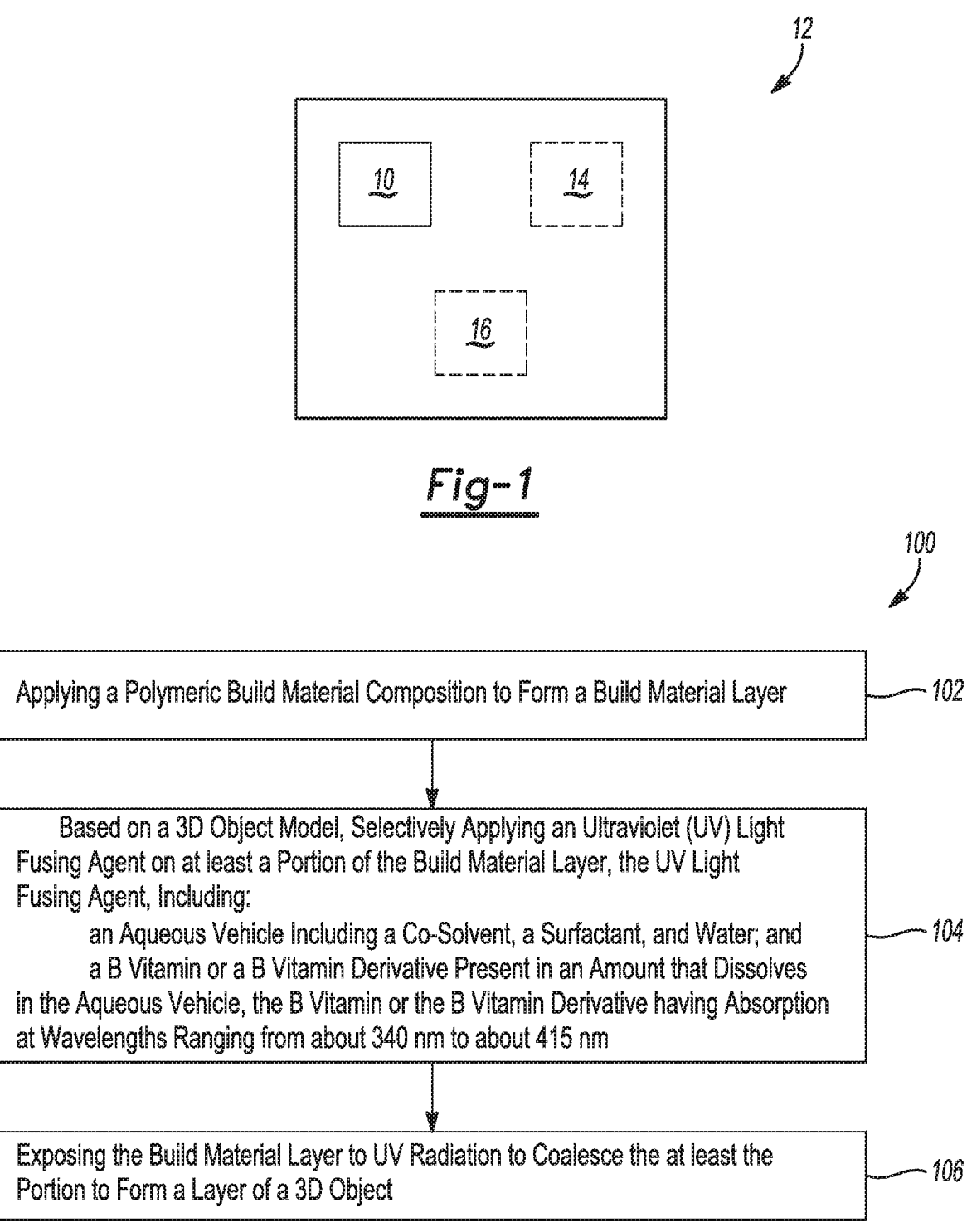
FIG. 1 schematically illustrates an example of a kit for three-dimensional printing.
FIG. 2 is a flow diagram depicting an example of a 3D printing method.

Some three-dimensional (3D) printing methods utilize a fusing agent, which includes an energy absorber, to pattern polymeric build material. In these examples, an entire layer of the polymeric build material is exposed to electromagnetic radiation, but the patterned region (which, in some instances, is less than the entire layer) of the polymeric build material is fused/coalesced and hardened to become a layer of a 3D part. In the patterned region, the fusing agent is capable of at least partially penetrating into voids between the polymeric build material particles, and is also capable of spreading onto the exterior surface of the polymeric build material particles. The energy absorber in the fusing agent is capable of absorbing radiation and converting the absorbed radiation to thermal energy, which in turn fuses/coalesces the polymeric build material that is in contact with the fusing agent. Fusing/coalescing causes the polymeric build material to join or blend to form a single entity (i.e., the layer of the 3D part). Fusing/coalescing may involve at least partial thermal merging, melting, binding, and/or some other mechanism that coalesces the polymeric build material to form the layer of the 3D part.

In this type of 3D printing method, infrared (IR) and/or visible radiation is/are often used. These types of radiation can be generated using incandescent lamps (blackbody emitters) that emit a wide band of photon energies. This may create selectivity issues, because the incandescent lamps emit a great deal of near infrared (NIR) and IR radiation that non-patterned polymeric build material can absorb. This can lead to inaccurate parts shapes and/or rough part edges. Additionally, several infrared (IR) and/or visible radiation absorbers are dark grey or black, which may cause the printed parts to have the corresponding, and frequently undesirable, dark or even black color.

Narrow-band emission sources, such as UV light emitting diodes (LED) may be a suitable alternative for these 3D print systems.

A UV light fusing agent is disclosed herein that is formulated with a B vitamin or B vitamin derivative having absorption at wavelengths ranging from about 340 nm to about 415 nm. The B vitamins and B vitamin derivatives disclosed herein are highly soluble in water, which renders them particularly suitable for incorporation into an aqueous vehicle. The resulting UV light fusing agent can be dispensed from an inkjet printhead, which enables it to be controllably applied at the voxel level. The B vitamins and B vitamin derivatives disclosed herein also exhibit strong absorption in the near-UV range, which contributes to the highly effectively UV-based coalescence of 3D objects formed with the UV light fusing agent. Still further, the B vitamins or B vitamin derivatives are complementary with the human metabolism, which renders the fusing agent suitable for use in creating 3D objects for a variety of applications, such as food packaging, other commodity packaging, pharmacology, biomedical applications, etc. Yet further, some of the B vitamins or B vitamin derivatives are substantially colorless and thus can generate much lighter (e.g., white, off-white, or even translucent) 3D objects than comparative infrared (IR) and/or visible radiation absorbers.

Throughout this disclosure, a weight percentage that is referred to as "wt % active" refers to the loading of an active component of a dispersion or other formulation that is present, e.g., in the fusing agent, detailing agent, etc. For example, a surfactant may be present in a water-based formulation (e.g., stock solution or dispersion) before being incorporated into the fusing agent vehicle. In this example, the wt % actives of the surfactant accounts for the loading (as a weight percent) of the surfactant molecules that are present in the fusing agent, and does not account for the weight of the other components (e.g., water, etc.) that are present in the stock solution or dispersion with the surfactant molecules. The term "wt %," without the term actives, refers to the loading (in the fusing agent, etc.) of a 100% active component that does not include other non-active components therein.

UV Light Fusing Agent

The ultraviolet (UV) light fusing agent disclosed herein includes an aqueous vehicle including a co-solvent, a surfactant, and water; and a B vitamin or a B vitamin derivative present in an amount that dissolves in the aqueous vehicle, the B vitamin or the B vitamin derivative having absorption at wavelengths ranging from about 340 nm to about 415 nm. In some examples, the UV light fusing agent consists of these components. In other examples, the UV light fusing agent may include other additives. Examples of suitable additive include an anti-kogation agent, a chelating agent, an anti-microbial agent, a buffer, a pH adjuster, a preservative, and combinations thereof.

The B vitamin and/or the B vitamin derivative functions as the UV energy absorber in the fusing agent. The example vitamins and vitamin derivatives efficiently absorb the UV radiation, convert the absorbed UV radiation to thermal energy, and promote the transfer of the thermal heat to polymeric build material composition in order to coalesce the polymeric build material composition. Any B vitamins and/or B vitamin derivatives that are water soluble and that have absorption at wavelengths ranging from about 340 nm to about 415 nm may be used in the UV light fusing agent. The phrase "that has absorption at wavelengths ranging from about 340 nm to about 415 nm" means that the B vitamin or B vitamin derivative exhibits maximum absorption at a wavelength within the given range and/or has an absorbance of about 0.1 (about 80% transmittance or less) at one or more wavelengths within the given range. Some of the B vitamins or B vitamin derivatives have lower absorbance. These B vitamins or B vitamin derivatives can still result in suitable coalescence and fusing when they are coupled with a higher intensity and/or a higher dose (where dose=intensity*radiation time).

Examples of suitable B vitamins include riboflavin (vitamin B2), pantothenic acid (vitamin B5), pyridoxine (one form of vitamin B6), pyridoxamine (another form of vitamin B6), biotin (vitamin B7), folic acid (synthetic form of vitamin B9), cyanocobalamin (synthetic form of vitamin B12), and combinations thereof. Examples of suitable B vitamin derivatives include flavin mononucleotide, pyridoxal phosphate hydrate, pyridoxal hydrochloride, pyridoxine hydrochloride, and combinations thereof. Any combination of one or more B vitamins and one or more B vitamin derivatives may also be used. This may be desirable, for example, when one vitamin or vitamin derivative is less absorbing.

The B vitamin and/or B vitamin derivative may be selected such that it has a targeted wavelength of maximum absorption for the 3D print system including the narrow UV-band emission source. For example, cyanocobalamin exhibits maximum absorption at about 360 nm and thus may be selected for the fusing agent when the 3D print system includes a UV light emitting diode (LED) emitting at 365 nm. For another, folic acid exhibits maximum absorption at about 365 nm and thus may be selected for the fusing agent when the 3D print system includes a UV LED emitting at 365 nm. For still another, riboflavin exhibits its second highest absorption peak at about 375 nm and thus may be selected for the fusing agent when the 3D print system includes either a UV LED emitting at 365 nm or at 395 nm. For yet another, pyridoxal phosphate exhibits maximum absorption at about 390 nm and thus may be selected for the fusing agent when the 3D print system includes a UV light emitting diode emitting at 395 nm. While the B vitamin or B vitamin derivative may be specifically selected such that it has a targeted wavelength of maximum absorption for a targeted narrow UV-band emission source, it is to be understood that sufficient absorption and fusing can take place at wavelengths at the tail of the peak. As such, the B vitamin or B vitamin derivative does not have to be selected such that it has a targeted wavelength of maximum absorption for a targeted narrow UV-band emission source. Additionally, as noted above, UV intensity and/or dosage may also be adjusted to enhance coalescence and fusing.

The amount of the UV light absorber, i.e., the B vitamin and/or B vitamin derivative, present in the UV light fusing agent will depend, in part, upon its solubility in water and its effect on the jettability of the fusing agent. When solubility limit of the B vitamin and/or B vitamin derivative is low, the B vitamin and/or B vitamin derivative may be present in an amount ranging from about 1 wt % to about 5 wt % of the total weight of the fusing agent. For example, when the B vitamin or the B vitamin derivative is selected from the group consisting of riboflavin (solubility in water 1000 mg/3,000-15,000 mL depending on the crystal structure), folic acid (solubility in water 0.01 mg/mL), cyanocobalamin (solubility in water 1000 mg/80 mL), panthotenic acid (solubility in water 2110 mg/mL), biotin (solubility in water 0.22 mg/mL), pyridoxine (solubility in water ranging from 79 mg/mL to 220 mg/mL), and combinations thereof, the B vitamin or the B vitamin derivative is present in an amount ranging from about 1 wt % to about 5 wt % based on a total weight of the UV light fusing agent.

For example, when the B vitamin or the B vitamin derivative is selected from the group consisting pyridoxal phosphate hydrate (solubility in water 5.7 mg/mL), pyridoxal hydrochloride (solubility in water 11.7 mg/mL), pyridoxine hydrochloride (solubility in water 200 mg/mL), pyridoxamine (solubility in water 29 mg/mL), and combinations thereof, the B vitamin or the B vitamin derivative may be present in an amount ranging from about 1 wt % to about 8 wt % based on a total weight of the UV light fusing agent.

The B vitamin or the B vitamin derivative is capable of absorbing enough energy during 3D printing to heat and coalesce the polymeric build material composition. As such, the UV light fusing agent is devoid of adhesives. For example, the UV light fusing agent excludes a polymeric molecule bearing an adhesive moiety.

The aqueous vehicle of the UV light fusing agent includes a co-solvent. Classes of water soluble or water miscible organic co-solvents that may be used in the fusing agent include aliphatic alcohols, aromatic alcohols, diols, polyols, glycols, long chain alcohols, glycol ethers, polyglycol ethers, lactams, formamides (substituted and unsubstituted), and acetamides (substituted and unsubstituted). Examples of these co-solvents include primary aliphatic alcohols, secondary aliphatic alcohols, 1,2-alcohols, 1,3-alcohols, 1,5-alcohols, 1,6-hexanediol or other diols (e.g., 1,2-propanediol, 1,5-pentanediol, 2-methyl-1,3-propanediol, etc.), glycerol, ethylene glycol alkyl ethers, propylene glycol alkyl ethers, higher homologs ($C_6$-$C_{12}$) of polyethylene glycol alkyl ethers, triethylene glycol, tetraethylene glycol, tripropylene glycol methyl ether, polyethylene glycols (PEG) of different weight average molecular weights (e.g., PEG 200, PEG 300, PEG 400, etc.), N-alkyl caprolactams, unsubstituted caprolactams, 2-pyrrolidone, 1-methyl-2-pyrrolidone, 1-(2-hydroxyethyl)-2-pyrrolidone, and the like. In one example, the UV light fusing agent includes an eco-friendly co-solvent, such as glycerol, polyethylene glycols (PEG) of different weight average molecular weights (e.g., PEG 200, PEG 300, PEG 400, etc.), or combinations thereof.

The co-solvent(s) may be present in the UV light fusing agent in a total amount ranging from about 1 wt % active to about 55 wt % active based upon the total weight of the UV light fusing agent. In an example, the UV light fusing agent includes from about 2 wt % active to about 15 wt % active, or from about 5 wt % active to about 10 wt % active, or from about 10 wt % active to about 50 wt % active of the co-solvent(s).

The aqueous vehicle of the UV light fusing agent includes a surfactant. Suitable surfactant(s) include non-ionic or anionic surfactants. Other suitable surfactant(s) include quaternary-ammonium surfactants. Some example surfactants include alcohol ethoxylates, alcohol ethoxysulfates, acetylenic diols, alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, fluorosurfactants, and the like. Some specific examples of non-ionic surfactants include the following from Evonik Degussa: SURFYNOL® SEF (a self-emulsifiable, wetting agent based on acetylenic diol chemistry), SURFYNOL® 440 or SURFYNOL® CT-111 (non-ionic ethoxylated low-foam wetting agents), SURFYNOL® 420 (non-ionic ethoxylated wetting agent and molecular defoamer), SURFYNOL® 104E (non-ionic wetting agents and molecular defoamer), and TECO® Wet 510 (organic surfactant). Other specific examples of non-ionic surfactants include the following from The Dow Chemical Company: TERGITOL™ TMN-6, TERGITOL™ 15-S-7, and TERGITOL™ 15-S-9 (a secondary alcohol ethoxylate). Other suitable non-ionic surfactants are available from Chemours, including the CAPSTONE® fluorosurfactants, such as CAPSTONE® FS-35 (a non-ionic fluorosurfactant). Some specific examples of anionic surfactants include alkyldiphenyloxide disulfonate (e.g., the DOW-FAX™ series, such a 2A1, 3B2, 8390, C6L, C10L, and 30599, from The Dow Chemical Company), docusate sodium (i.e., dioctyl sodium sulfosuccinate), sodium dodecyl sulfate (SDS). In one example, the UV light fusing agent includes an eco-friendly co-surfactant, such as sodium docusate, sodium dodecyl sulfate, or combinations thereof.

Whether a single surfactant is used or a combination of surfactants is used, the total amount of surfactant(s) in the UV light fusing agent may range from about wt % active to about 3 wt % active based on the total weight of the UV light fusing agent. In an example, the total amount of surfactant(s) in the UV light fusing agent may be about 1 wt % active based on the total weight of the UV light fusing agent.

Some examples of the UV light fusing agent include an anti-kogation agent. An anti-kogation agent may be particularly desirable in a UV light fusing agent that is/are to be jetted using thermal inkjet printing. Kogation refers to the deposit of dried printing liquid (e.g., fusing agent) on a heating element of a thermal inkjet printhead. Anti-kogation agent(s) is/are included to assist in preventing the buildup of kogation.

Examples of suitable anti-kogation agents include oleth-3-phosphate (commercially available as CRODAFOS™ O3A or CRODAFOS™ N-3A) or dextran 500 k. Other suitable examples of the anti-kogation agents include CRODAFOS™ HCE (phosphate-ester from Croda Int.), CRODAFOS® O10A (oleth-10-phosphate from Croda Int.), or DISPERSOGEN® LFH (polymeric dispersing agent with aromatic anchoring groups, acid form, anionic, from Clariant), etc. It is to be understood that any combination of the anti-kogation agents listed may be used.

When included, the anti-kogation agent may be present in the UV light fusing agent in an amount ranging from about 0.1 wt % active to about 1.5 wt % active, based on the total weight of the UV light fusing agent. In an example, the anti-kogation agent is present in an amount of about 0.5 wt % active, based on the total weight of the UV light fusing agent.

Some examples of the UV light fusing agent include a chelating agent. Chelating agents (or sequestering agents) may be included in the aqueous vehicle of the UV light fusing agent to eliminate the deleterious effects of heavy metal impurities. In an example, the chelating agent is selected from the group consisting of methylglycinediacetic acid, trisodium salt; 4,5-dihydroxy-1,3-benzenedisulfonic acid disodium salt monohydrate; ethylenediaminetetraacetic acid (EDTA); hexamethylenediamine tetra(methylene phosphonic acid), potassium salt; and combinations thereof. Methylglycinediacetic acid, trisodium salt (Na3MGDA) is commercially available as TRILON® M from BASF Corp. 4,5-dihydroxy-1,3-benzenedisulfonic acid disodium salt monohydrate is commercially available as TIRON™ monohydrate. Hexamethylenediamine tetra(methylene phosphonic acid), potassium salt is commercially available as DEQUEST® 2054 from Italmatch Chemicals.

Whether a single chelating agent is used or a combination of chelating agents is used, the total amount of chelating agent(s) in the UV light fusing agent may range from greater than 0 wt % active to about 0.5 wt % active based on the total weight of the UV light fusing agent. In an example, the chelating agent is present in an amount ranging from about 0.05 wt % active to about 0.2 wt % active based on the total weight of UV light fusing agent. In another example, the chelating agent(s) is/are present in the UV light fusing agent in an amount of about 0.05 wt % active (based on the total weight of the UV light fusing agent).

Some examples of the UV light fusing agent include an anti-microbial agent. Antimicrobial agents are also known as biocides and/or fungicides. Examples of suitable antimicrobial agents include the NUOSEPT® (Ashland Inc.), UCAR-CIDE™ or KORDEK™ or ROCIMA™ (The Dow Chemical Company), PROXEL® (Arch Chemicals) series, ACTICIDE® B20 and ACTICIDE® M20 and ACTICIDE® MBL (blends of 2-methyl-4-isothiazolin-3-one (MIT), 1,2-benzisothiazolin-3-one (BIT) and Bronopol) (Thor Chemicals), AXIDE™ (Planet Chemical), NIPACIDE™ (Clariant), blends of 5-chloro-2-methyl-4-isothiazolin-3-one (CIT or CMIT) and MIT under the tradename KATHON™ (The Dow Chemical Company), and combinations thereof.

In an example, the total amount of antimicrobial agent(s) in the UV light fusing agent ranges from about 0.01 wt % active to about 0.05 wt % active (based on the total weight of the UV light fusing agent). In another example, the total amount of antimicrobial agent(s) in the UV light fusing agent is about 0.04 wt % active (based on the total weight of the UV light fusing agent).

Some examples of the UV light fusing agent include a buffer. The buffer may be TRIS (tris(hydroxymethyl)aminomethane or TRIZMA®), TRIS or TRIZMA® hydrochloride, bis-tris propane, TES (2-[[2-Hydroxy-1,1-bis(hydroxymethyl)ethyl]amino]ethanesulfonic acid), MES (2-ethanesulfonic acid), MOPS (3-(N-morpholino)propanesulfonic acid), HEPES (4-(2-hydroxyethyl)-1-piperazineethanesulfonic acid), DIPSO (3-(N,N-Bis[2-hydroxyethyl]amino)-2-hydroxypropanesulfonic acid), Tricine (N-[tris(hydroxymethyl)methyl]glycine), HEPPSO (β-Hydroxy-4-(2-hydroxyethyl)-1-piperazinepropanesulfonic acid monohydrate), POPSO (Piperazine-1,4-bis(2-hydroxypropanesulfonic acid) dihydrate), EPPS (4-(2-Hydroxyethyl)-1-piperazinepropanesulfonic acid, 4-(2-Hydroxyethyl)piperazine-1-propanesulfonic acid), TEA (triethanolamine buffer solution), Gly-Gly (Diglycine), bicine (N,N-Bis(2-hydroxyethyl)glycine), HEPBS (N-(2-Hydroxyethyl)piperazine-N'-(4-butanesulfonic acid)), TAPS ([tris(hydroxymethyl)methylamino]propanesulfonic acid), AMPD (2-amino-2-methyl-1,3-propanediol), TABS (N-tris (Hydroxymethyl)methyl-4-aminobutanesulfonic acid), or the like.

In an example, the total amount of buffer(s) in the UV light fusing agent ranges from about 0.01 wt % to about 3 wt % (based on the total weight of the UV light fusing agent).

Some examples of the UV light fusing agent include a pH adjuster. Suitable pH adjusters may include amino acids or sodium bicarbonate. An example of a suitable amino acid pH adjuster is taurine. In an example, the total amount of the pH adjuster(s) in the UV light fusing agent ranges from about 0.01 wt % to about 3 wt % (based on the total weight of the UV light fusing agent).

Some examples of the UV light fusing agent include a preservative. Examples of suitable preservatives include 2-phenoxyethanol, sodium benzoate, and parabens. In an example, the total amount of the preservative(s) in the UV light fusing agent ranges from about 0.1 wt % to about 3 wt % (based on the total weight of the UV light fusing agent).

Some examples of the UV light fusing agent also include a base. In some examples, the B vitamin or the B vitamin derivative is more soluble at a neutral or basic pH. For example, folic acid is more soluble in an aqueous vehicle having a pH greater than 5. As such, it may be desirable to add a base, such as potassium hydroxide, sodium hydroxide, or tetramethylammonium hydroxide, until the desired pH is obtained. In an example, the total amount of the base in the UV light fusing agent ranges from about 0.5 wt % to about 5 wt % (based on the total weight of the UV light fusing agent). In other examples, the amount of base may range from about 0.75 wt % to about 2.5 wt %.

The balance of the UV light fusing agent is water (e.g., deionized water, purified water, etc.). The amount of water may vary depending upon the amounts of the other components in the UV light fusing agent. In one example, the UV light fusing agent is jettable via a thermal inkjet printhead, and includes from about 50 wt % to about 90 wt % water.

One example of the UV light fusing agent includes the B vitamin or the B vitamin derivative, the co-solvent, the surfactant, water, and an additive selected from the group consisting of the anti-kogation agent, the chelating agent, the anti-microbial agent, the buffer, and combinations thereof. As one specific example with these components, the UV light fusing agent includes riboflavin, tripropylene glycol methyl ether, SURFYNOL® SEF, CAPSTONE® FS-35, CRODAFOS™ O3A, ACTICIDE® B20, TRIS, and water.

Another example of the UV light fusing agent includes the B vitamin or the B vitamin derivative, the co-solvent, the surfactant, water, and an additive selected from the group consisting of the pH adjuster, the preservative, and combinations thereof. As one specific example with these components, the UV light fusing agent includes folic acid, glycerol, PEG 300, taurine, 2-phenoxyethanol, sodium docusate, sodium dodecyl sulfate, potassium hydroxide, and water. This example of the UV light fusing agent may be desirable for food packaging, other commodity packaging, pharmacology, biomedical and other like applications as the components may be considered to be relatively eco-friendly.

3D Printing Kits and 3D Printing Multi-Fluid Kits

The UV light fusing agent disclosed herein may be part a kit for 3D printing that does not include other fluids or agents. In this example, the kit is a single fluid kit. In other examples, the UV light fusing agent may be included in a multi-fluid kit for 3D printing. An example of a multi-fluid kit is shown schematically in FIG. 1. In one example, the multi-fluid kit 12 includes the UV light fusing agent 10 including an aqueous vehicle including a co-solvent, a surfactant, and water; and a B vitamin or a B vitamin derivative present in an amount that dissolves in the aqueous vehicle, the B vitamin or a B vitamin derivative having absorption at wavelengths ranging from about 340 nm to about 415 nm; and a detailing agent 14 including a second aqueous vehicle and excluding an absorber having absorption at wavelengths ranging from about 340 nm to about 415 nm. In other examples, the multi-fluid kit 12 may include the UV light fusing agent 10 and a colored ink 16. In yet further examples, the multi-fluid kit 12 may include the UV light fusing agent 10, the detailing agent 14, and the colored ink 16.

The UV light fusing agent 10 disclosed herein may also be included in a 3D printing kit. An example of the 3D printing kit includes a polymeric build material composition; and the ultraviolet (UV) light fusing agent 10. Some examples of the 3D printing kit also include the detailing agent 14 and/or colored ink 16.

It is to be understood that the fluids 10, 14, 16 of the multi-fluid kits 12 or the fluid(s) 10, 14, 16 and composition of the 3D printing kits may be maintained separately until used together in examples of the 3D printing method disclosed herein. The fluid(s) 10, 14, 16 and/or compositions may each be contained in one or more containers prior to and during printing, but may be combined together during printing. The containers can be any type of a vessel (e.g., a reservoir), box, or receptacle made of any material.

As used herein, it is to be understood that the terms "set" or "kit" may, in some instances, be synonymous with "composition."

Example compositions of the detailing agent 14, the colored ink 16, and the build material composition that may be used with the UV light fusing agent 10 will now be described.

Detailing Agent

Some examples of the multi-fluid kit 12 and/or 3D printing kit include the detailing agent 14. The detailing agent 14 may include a surfactant, a co-solvent, and a balance of water. In some examples, the detailing agent 14 consists of these components, and no other components. In some other examples, the detailing agent 14 may further include additional components, such as anti-kogation agent(s) and/or antimicrobial agent(s) and/or preservatives (each of which is described above in reference to the UV light fusing agent 10).

The surfactant(s) that may be used in the detailing agent 14 include any of the surfactants listed herein in reference to the UV light fusing agent 10. The total amount of surfactant(s) in the detailing agent 14 may range from about 0.10 wt % to about 5 wt % with respect to the total weight of the detailing agent 14.

The co-solvent(s) that may be used in the detailing agent 14 include any of the co-solvents listed above in reference to the UV light fusing agent 10. The total amount of co-solvent(s) in the detailing agent 14 may range from about 1 wt % to about 65 wt % with respect to the total weight of the detailing agent 14.

In the examples disclosed herein, the detailing agent 14 does not include a colorant. In these examples, the detailing agent 14 may be colorless, meaning that the detailing agent is achromatic and does not include a colorant (e.g., a pigment or a dye).

The balance of the detailing agent 14 is water. As such, the amount of water may vary depending upon the amounts of the other components that are included.

Colored Ink

Some examples of the multi-fluid kit 12 and/or 3D printing kit include a colored ink 16. In these examples, the colored ink 16 is separate from the UV light fusing agent 10 disclosed herein. A colored ink 16 separate from the UV light fusing agent 10 may be desirable because the two agents 10, 16 can be applied separately, thus allowing control over where color is added. The colored ink 16 may be applied during printing (e.g., on the polymeric build material with the UV light fusing agent 10) or after printing (e.g., on a 3D printed object) to impart a colored appearance to the 3D printed object.

The colored ink 16 may include a colorant, a co-solvent, and a balance of water. In some examples, the colored ink 16 consists of these components, and no other components. In still other examples, the colored ink 16 may further include additional components that aid in colorant dispersability and/or ink jettability. Some examples of additional ink components include dispersant(s) (e.g., a water-soluble acrylic acid polymer (e.g., CARBOSPERSE® K7028 available from Lubrizol), water-soluble styrene-acrylic acid copolymers/resins (e.g., JONCRYL® 296, JONCRYL® 671, JONCRYL® 678, JONCRYL® 680, JONCRYL® 683, JONCRYL® 690, etc. available from BASF Corp.), a high molecular weight block copolymer with pigment affinic groups (e.g., DISPERBYK®-190 available BYK Additives and Instruments), or water-soluble styrene-maleic anhydride copolymers/resins), humectant(s), surfactant(s), anti-kogation agent(s), and/or antimicrobial agent(s) (some of which is described herein in reference to the UV light fusing agent 10).

The colored ink 16 may be a black agent, a cyan agent, a magenta agent, or a yellow agent. As such, the colorant may be a black colorant, a cyan colorant, a magenta colorant, a yellow colorant, or a combination of colorants that together achieve a black, cyan, magenta, or yellow color.

The colorant of the colored ink 16 may be any pigment or dye. When the colored ink 16 is separate agent, the pigment or dye is to impart color, and is not meant to replace the UV light absorber (i.e., the B vitamin and/or the B vitamin derivative) in the fusing agent 10. As such, the colorant may function as a UV light absorber or as a partial UV light absorber, or may not provide any UV light absorption.

An example of the pigment based colored ink may include from about 1 wt % to about 10 wt % of pigment(s), from about 10 wt % to about 30 wt % of co-solvent(s), from about 1 wt % to about 10 wt % of dispersant(s), 0.01 wt % to about 1 wt % of anti-kogation agent(s), from about 0.05 wt % to about 0.1 wt % antimicrobial agent(s), and a balance of water. An example of the dye based colored ink may include from about 1 wt % to about 7 wt % of dye(s), from about 10 wt % to about 30 wt % of co-solvent(s), from about 1 wt % to about 7 wt % of dispersant(s), from about 0.05 wt % to about 0.1 wt % antimicrobial agent(s), from 0.05 wt % to about 0.1 wt % of chelating agent(s), from about 0.005 wt % to about 0.2 wt % of buffer(s), and a balance of water.

Build Material Composition

The build material composition includes a polymeric build material. Examples of suitable polymeric materials include a polyamide (PAs) (e.g., PA 11/nylon 11, PA 12/nylon 12, PA 6/nylon 6, PA 8/nylon 8, PA 9/nylon 9, PA 66/nylon 66, PA 612/nylon 612, PA 812/nylon 812, PA 912/nylon 912, etc.), a polyolefin (e.g., polyethylene, polypropylene, etc.), a thermoplastic polyamide (TPA), a thermoplastic polyurethane (TPU), a styrenic block copolymer (TPS), a thermoplastic polyolefin elastomer (TPO), a thermoplastic vulcanizate (TPV), thermoplastic copolyester (TPC), a polyether block amide (PEBA), or a combination thereof.

In some examples, the polymeric build material may be in the form of a powder. In other examples, the polymeric build material may be in the form of a powder-like material, which includes, for example, short fibers having a length that is greater than its width. In some examples, the powder or powder-like material may be formed from, or may include, short fibers that may, for example, have been cut into short lengths from long strands or threads of material.

The polymeric build material may be made up of similarly sized particles and/or differently sized particles. In an example, the average particle size of the polymeric build material ranges from about 2 μm to about 225 μm. In another example, the average particle size of the polymeric build material ranges from about 10 μm to about 130 μm. As noted above, the term "average particle size", as used herein, may refer to a number-weighted mean diameter or a volume-weighted mean diameter of a particle distribution. In some instances, the average particle size represents D50, or the size that splits the distribution with half above and half below the given diameter.

When the polymeric build material is a crystalline or semi-crystalline material, the polymer may have a wide processing window of greater than 5° C., which can be defined by the temperature range between the melting point and the re-crystallization temperature. In an example, the polymer may have a melting point ranging from about 35° C. to about 300° C. As other examples, the polymer may have a melting point ranging from about 155° C. to about 225° C., from about 155° C. to about 215° C., about 160° C. to about 200° C., from about 170° C. to about 190° C., or from about 182° C. to about 189° C. As still another example, the polymer may be a polyamide having a melting point of about 180° C. or a polypropylene having a melting point of about 160° C.

As discussed herein, other polymers do not have a melting point, but rather have a range of temperatures over which the polymers soften. In some examples, this softening temperature range is from about 130° C. to about 250° C.

In some examples, the polymeric build material does not substantially absorb radiation having a wavelength within the range of 300 nm to 405 nm. The phrase "does not substantially absorb" means that the absorptivity of the polymeric build material at a particular wavelength is 25% or less (e.g., 20%, 10%, 5%, etc.).

In some examples, in addition to the polymeric build material, the build material composition may include an antioxidant, an antistatic agent, a flow aid, or a combination thereof. While several examples of these additives are provided, it is to be understood that these additives are selected to be thermally stable (i.e., will not decompose) at the 3D printing temperatures.

Antioxidant(s) may be added to the build material composition to prevent or slow molecular weight decreases of the polymeric build material and/or to further prevent or slow discoloration (e.g., yellowing) of the composition by preventing or slowing oxidation of the polymeric particles. In some examples, the antioxidant may be a radical scavenger. In these examples, the antioxidant may include IRGANOX® 1098 (benzenepropanamide, N,N'-1,6-hexanediylbis(3,5-bis(1,1-dimethylethyl)-4-hydroxy)), IRGANOX® 254 (a mixture of 40% triethylene glycol bis(3-tert-butyl-4-hydroxy-5-methylphenyl), polyvinyl alcohol and deionized water), and/or other sterically hindered phenols. In other examples, the antioxidant may include a phosphite and/or an organic sulfide (e.g., a thioester). The antioxidant may be in the form of fine particles (e.g., having an average particle size of 5 μm or less) that are dry blended with the polymeric build material. In an example, the antioxidant may be included in the build material composition in an amount ranging from about 0.01 wt % to about 5 wt %, based on the total weight of the build material composition. In other examples, the antioxidant may be included in the build material composition in an amount ranging from about 0.01 wt % to about 2 wt % or from about 0.2 wt % to about 1 wt %, based on the total weight of the build material composition.

Antistatic agent(s) may be added to the build material composition to suppress tribo-charging. Examples of suitable antistatic agents include aliphatic amines (which may be ethoxylated), aliphatic amides, quaternary ammonium salts (e.g., behentrimonium chloride or cocamidopropyl betaine), esters of phosphoric acid, polyethylene glycolesters, or polyols. Some suitable commercially available antistatic agents include HOSTASTAT® FA 38 (natural based ethoxylated alkylamine), HOSTASTAT® FE2 (fatty acid ester), and HOSTASTAT® HS 1 (alkane sulfonate), each of which is available from Clariant Int. Ltd.). In an example, the antistatic agent is added in an amount ranging from greater than 0 wt % to less than 5 wt %, based upon the total weight of the build material composition.

Flow aid(s) may be added to improve the coating flowability of the build material composition. Flow aids may be particularly beneficial when the build material composition has an average particle size less than 25 μm. The flow aid improves the flowability of the build material composition by reducing the friction, the lateral drag, and the tribocharge buildup (by increasing the particle conductivity). Examples of suitable flow aids include tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), calcium silicate (E552), magnesium trisilicate (E553a), talcum powder (E553b), sodium aluminosilicate (E554), potassium aluminum silicate (E555), calcium aluminosilicate (E556), bentonite (E558), aluminum silicate (E559), stearic acid (E570), and polydimethylsiloxane (E900). In an example, the flow aid is added in an amount ranging from greater than 0 wt % to less than 5 wt %, based upon the total weight of the build material composition.

Printing Methods and Methods of Use

Figure 3:
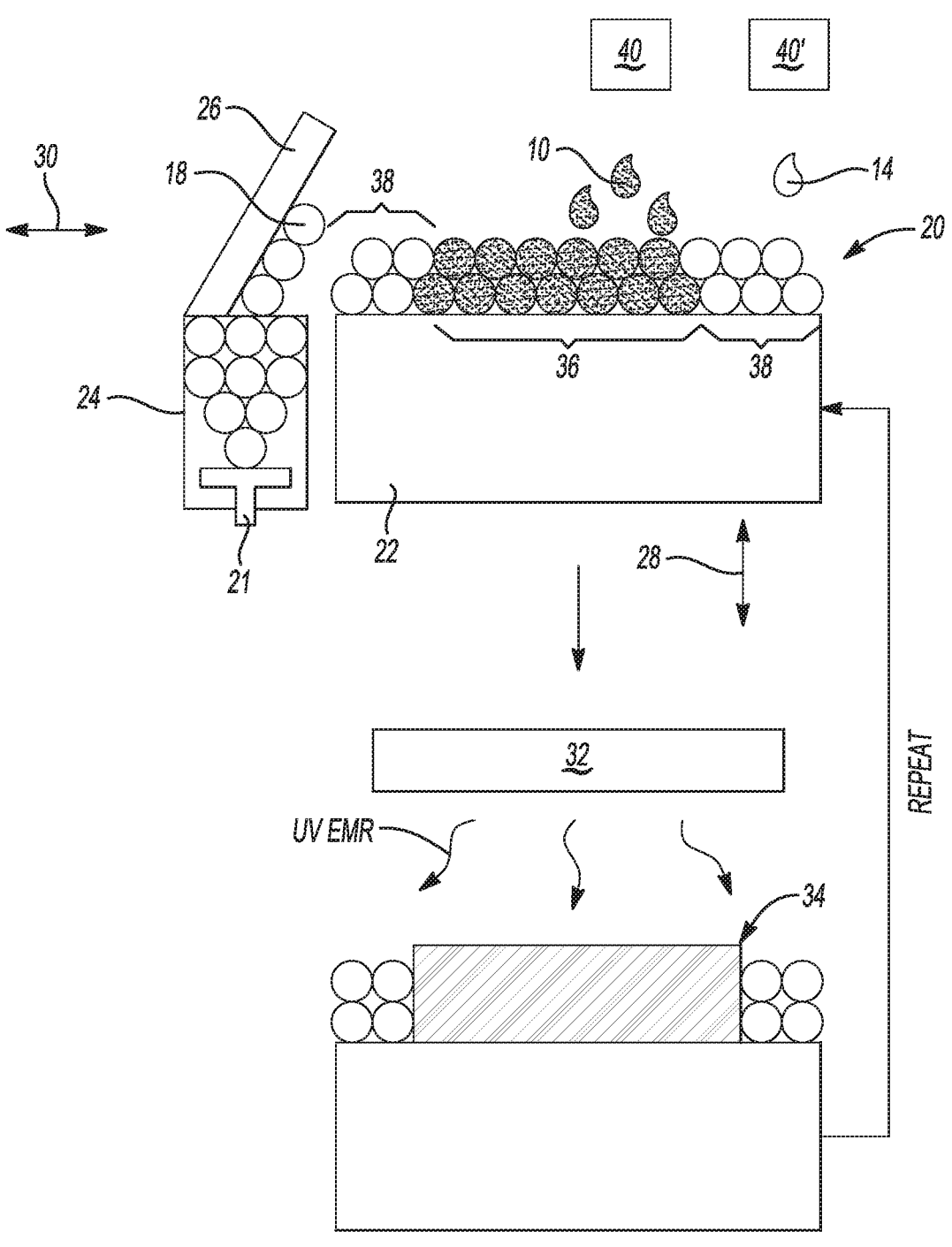
FIG. 3 is a schematic illustration of one example of the 3D printing method of FIG. 2.

An example of the 3D printing method is shown and described in reference to FIG. 2 and FIG. 3.

The 3D printing method 100 shown in FIG. 2 includes applying a polymeric build material composition to form a build material layer (reference numeral 102); based on a 3D object model, selectively applying an ultraviolet (UV) light fusing agent on at least a portion of the build material layer, the UV light fusing agent including an aqueous vehicle including a co-solvent, a surfactant, and water and a B vitamin or a B vitamin derivative present in an amount that dissolves in the aqueous vehicle, the B vitamin or the B vitamin derivative having absorption at wavelengths ranging from about 340 nm to about 415 nm (reference numeral 104); and exposing the build material layer to UV radiation to coalesce the at least the portion to form a layer of a 3D object (reference numeral 106).

Prior to execution of the method 100, it is to be understood that a controller may access data stored in a data store pertaining to a 3D object that is to be printed. For example, the controller may determine the number of layers of the build material composition that are to be formed, the locations at which any of the agents is/are to be deposited on each of the respective layers, etc.

Referring now to FIG. 3, an example of the method 100, which utilizes the UV fusing agent 10 (including the B vitamin and/or the B vitamin derivative)), the build material composition 18 and the detailing agent 14 is graphically depicted.

In FIG. 3, a layer 20 of the build material composition 18 is applied on a build area platform 22. A printing system may be used to apply the build material composition 18. The printing system may include the build area platform 22, a build material supply 24 containing the build material composition 18, and a build material distributor 26.

The build area platform 22 is a substantially horizontal build platform that does not function as a mold for the build material composition 18 applied thereto. Rather, the build area platform is a flat surface upon which the build material composition 18 can be applied and patterned to define any desirable shape. The build area platform 22 may be integrated with the printing system or may be a component that is separately insertable into the printing system. For example, the build area platform 22 may be a module that is available separately from the printing system. The build material platform 22 that is shown is also one example, and could be replaced with another support member, such as a platen, a fabrication/print bed, a glass plate, or another build surface.

The build area platform 22 receives the build material composition 18 from the build material supply 24. The build area platform 22 may be moved in the directions as denoted by the arrow 28, e.g., along the z-axis, so that the build material composition 18 may be delivered to the build area platform 22 or to a previously formed layer. In an example, when the build material composition 18 is to be delivered, the build area platform 22 may be programmed to advance (e.g., downward) enough so that the build material distributor 26 can push, or another dispenser can dispense, the build material composition 18 onto the build area platform 22 to form a substantially uniform layer of the build material composition 18 thereon. The build area platform 22 may also be returned to its original position, for example, when a new part is to be built.

The build material supply 24 may be a container, bed, or other vessel or surface that is to deliver the build material composition 18 into a suitable position for spreading. In one example (not shown in FIG. 3), the build material supply 24 is a remote vessel that feeds the build material composition 18 into a build material dispenser (e.g., a feeder vane) from above through a tube or other conduit. In some instances, the build material supply 24 may be part of the build material dispenser, and thus may translate with the build material dispenser. In this example, the dispenser may be moved in the directions as denoted by the arrow 30, e.g., along the y-axis, over and across the build area platform 22 to spread the layer 20 of the build material composition 18 over the build area platform 22. This enables the build material composition 18 to be delivered continuously to the build area platform 22 rather than being supplied from a single location at the side of the printing system as depicted in FIG. 3. In this example, the build material distributor 26 could also be used to smooth the dispensed layer 20.

In the example shown in FIG. 3, the build material supply 24 includes a mechanism 21 (e.g., a delivery piston or pump) to provide, e.g., move, the build material composition 18 from a storage location to a position to be spread onto the build area platform 22 or onto a previously patterned layer. For example, as shown in FIG. 3, the build material supply 24 may be a stationary container located at the side of the printing system, and its delivery mechanism 21 can push the build material composition 18 into a position where it can be spread across the build area platform 22, e.g., by the build material distributor 26.

The build material distributor 26 may be moved in the directions as denoted by the arrow 30, e.g., along the y-axis, over the build material supply 24 and across the build area platform 22 to spread the layer 20 of the build material composition 18 over the build area platform 22. The build material distributor 26 may also be returned to a position adjacent to the build material supply 24 following the spreading of the build material composition 18. The build material distributor 26 may be a blade (e.g., a doctor blade), a roller, a combination of a roller and a blade, and/or any other device capable of spreading the build material composition 18 over the build area platform 22. For instance, the build material distributor 26 may be a counter-rotating roller.

Any example of the build material supply 24 may include heaters so that the build material composition 18 is heated to a supply temperature ranging from about 25° C. to about 150° C. In these examples, the supply temperature may depend, in part, on the build material composition 18 used and/or the 3D printer used. As such, the range provided is one example, and higher or lower temperatures may be used.

To generate a layer 20 of the build material composition 18, the controller (not shown) may process data, and in response, the build material supply 24 may transmit the build material composition 18 to a dispenser, or may appropriately position the particles of the build material composition 18 for spreading by the build material distributor 26. The controller may also process additional data, and in response, control the build material distributor 26 to spread the build material composition 18 over the build area platform 22 to form the layer 20 of the build material composition 18 thereon. In FIG. 3, one build material layer 20 has been formed.

The layer 20 has a substantially uniform thickness across the build area platform 22. In an example, the build material layer 20 has a thickness ranging from about 50 μm to about 950 μm. In another example, the thickness of the build material layer 20 ranges from about 30 μm to about 300 μm. It is to be understood that thinner or thicker layers may also be used. For example, the thickness of the build material layer 20 may range from about 20 μm to about 500 μm. The layer thickness may be about 2× (i.e., 2 times) the average particle size of the polymer particles at a minimum for finer part definition. In some examples, the layer 20 thickness may be about 1.2× the average particle size of the polymer particles in the build material composition 18.

After the build material composition 18 has been applied, and prior to further processing, the build material layer 20 may be exposed to pre-heating. In an example, the pre-heating temperature may be below the melting point or melting range of the polymer particles of the build material composition 18. As examples, the pre-heating temperature may range from about 5° C. to about 50° C. below the melting point or the lowest temperature of the softening range of the polymeric material. In an example, the pre-heating temperature ranges from about 50° C. to about 205° C. In still another example, the pre-heating temperature ranges from about 100° C. to about 190° C. It is to be understood that the pre-heating temperature may depend, in part, on the build material composition 18 used. As such, the ranges provided are some examples, and higher or lower temperatures may be used.

In other examples, the build material layer 20 is not pre-heated, but is maintained at room temperature.

When pre-heating is used, the layer 20 may be pre-heated using any suitable heat source that exposes all of the build material composition 18 in the layer to the heat. Examples of the heat source include a thermal heat source (e.g., a heater (not shown) integrated into the build area platform 22 (which may include sidewalls)) or a radiation source 32.

After the layer 20 is formed, and in some instances is pre-heated, the UV light fusing agent 10 is selectively applied on at least some of the build material composition 18 in the layer 20.

To form a layer 34 of a 3D object, at least a portion (e.g., portion 36) of the layer 20 of the build material composition 18 is patterned with the UV light fusing agent 10. The volume of the UV light fusing agent 10 that is applied per unit of the build material composition 18 in the patterned portion 36 may be sufficient to absorb and convert enough UV radiation so that the build material composition 18 in the patterned portion 36 will coalesce/fuse. The volume of the UV light fusing agent 10 that is applied per unit of the build material composition 18 may depend, at least in part, on the UV light absorber (the B vitamin and/or B vitamin derivative) used, the UV light absorber loading in the fusing agent 10, and the build material composition 18 used.

Some portion(s) 38 of the build material layer 20 may not be patterned with the UV light fusing agent 10, and thus is/are not to become part of the final 3D object layer 34. However, thermal energy generated during UV radiation exposure may propagate into the surrounding portion(s) 38 that do not have the fusing agent 10 applied thereto. An example of the detailing agent 14 disclosed herein may be selectively applied to the portion(s) 38 of the layer 20. The detailing agent 14 inhibits the propagation of thermal energy, and thus helps to prevent the coalescence of the non-patterned build material portion(s) 38.

After the UV light fusing agent 10 and, in some instances, the detailing agent 14 are selectively applied in the specific portion(s) 36, 38 of the layer 20, the entire layer 20 of the build material composition 18 is exposed to ultraviolet electromagnetic radiation (shown as UV EMR in FIG. 3).

The UV radiation is emitted from the radiation source 32. The length of time the UV radiation is applied for, or energy exposure time, may be dependent, for example, on one or more of: characteristics of the radiation source 32; characteristics of the build material composition 18; and/or characteristics of the UV light fusing agent 10.

It is to be understood that the UV radiation exposure may be accomplished in a single radiation event or in multiple radiation events. In an example, the exposure of the build material layer 20 to UV radiation is accomplished in multiple radiation events. In a specific example, the number of UV radiation events ranges from 3 to 8. In still another specific example, the exposure of the build material layer 20 to electromagnetic radiation may be accomplished in 3 radiation events. It may be desirable to expose the build material layer 20 to UV radiation in multiple radiation events to counteract a cooling effect that may be brought on by the amount of the agent 10, and in some instances the agent 14, that is/are applied to the build material layer 20. Additionally, it may be desirable to expose the build material layer 20 to UV radiation in multiple radiation events to sufficiently elevate the temperature of the polymeric build material composition 18 in the patterned portion(s) 36, without over heating the build material composition 18 in the non-patterned portion(s) 38.

The UV light absorber (i.e., the B vitamin and/or B vitamin derivative) has an efficient temperature boosting capacity, and thus enhances the absorption of the UV radiation, converts the absorbed UV radiation to thermal energy, and promotes the transfer of the thermal heat to the polymeric build material composition 18 in contact therewith. In an example, the B vitamin and/or B vitamin derivative in the UV light fusing agent 10 sufficiently elevates the temperature of the polymeric build material composition 18 in the portion 36 to a temperature at or above the melting point or within the softening range of the polymeric material, allowing coalescing/fusing (e.g., thermal merging, melting, binding, etc.) of the polymeric build material composition 18 to take place. The application of the UV radiation forms the 3D object layer 34.

In some examples, the UV radiation has a wavelength ranging from 300 nm to 415 nm, or from 350 nm to 405 nm, or from 360 nm to 380 nm. Radiation having wavelengths within the provided ranges may be absorbed by the B vitamin and/or B vitamin derivative in the fusing agent 10 and may heat the polymeric build material composition 18 in contact therewith, and may not be substantially absorbed by the non-patterned polymeric build material composition 18 in portion(s) 38.

After the 3D object layer 26 is formed, additional layer(s) may be formed thereon to create an example of the 3D object. To form the next layer, additional polymeric build material composition 18 may be applied on the layer 34. The UV light fusing agent 10 is then selectively applied on at least a portion of the additional build material composition 18, according to the 3D object model. The detailing agent 14 may be applied in any area of the additional build material composition 18 where coalescence is not desirable. After the UV light fusing agent 10, and in some instances the detailing agent 14, is/are applied, the entire layer of the additional polymeric build material composition 18 is exposed to UV radiation in the manner described herein. The application of additional polymeric build material composition 18, the selective application of the agent(s) 10, 14, and the UV radiation exposure may be repeated a predetermined number of cycles to form the final 3D object in accordance with the 3D object model.

As such, examples of the method 100 include iteratively applying the polymeric build material composition 18 to form respective build material layers 20; selectively applying the UV light fusing agent 10 on the respective build material layers to form respective patterned portions 36; and exposing the respective build material layers 20 to UV radiation.

If it is desirable to alter or enhance the color of the 3D object that is being formed, the separate colored ink 16 may also be applied with the UV light fusing agent in the patterned portion(s) 36. The colored ink 16 may be deposited in each layer or in the outermost layers. In this example, the colored ink 16 becomes embedded throughout the coalesced/fused build material composition of the 3D object layers 34. In other examples, the separate colored ink 16 may be applied to the surface of the final 3D object.

In the example method 100, any of the agents (fusing agent 10, detailing agent 14, coloring agent 16) may be dispensed from an applicator. Two applicators 40, 40' are shown in FIG. 3 respectively dispensing the UV light fusing agent 10 and the detailing agent 14. The applicator(s) 40, 40' may each be a thermal inkjet printhead, a piezoelectric printhead, a continuous inkjet printhead, etc., and the selective application of the agent(s) 10, 14, 16 may be accomplished by thermal inkjet printing, piezo electric inkjet printing, continuous inkjet printing, etc. It is to be understood that other applicators 40, 40' may be used that can selectively dispense a controlled amount of the agent(s) 10, 14.

The controller may process data, and in response, control the applicator(s) 40, 40' to deposit the fusing agent 10 and the detailing agent 14 onto predetermined portion(s) 36, 38 of the polymeric build material composition 18. The controller may also process data, and in response, control the applicator(s) 40, 40' to deposit the coloring agent 16. It is to be understood that the applicators 40, 40' may be separate applicators or a single applicator with several individual cartridges for dispensing the respective agents.

It is to be understood that the selective application of any of the agents (e.g., UV light fusing agent 10, detailing agent 14, etc.) may be accomplished in a single printing pass or in multiple printing passes. In some examples, the agent(s)/formulation(s) is/are selectively applied in a single printing pass. In some other examples, the agent(s) is/are selectively applied in multiple printing passes. In one of these examples, the number of printing passes ranging from 2 to 4. In still other examples, 2 or 4 printing passes are used. It may be desirable to apply the UV light fusing agent 10 in multiple printing passes to increase the amount, e.g., of the UV light absorber, that is applied to the polymeric build material composition 18, to avoid liquid splashing, to avoid displacement of the build material composition 18, etc.

To further illustrate the present disclosure, examples are given herein. It is to be understood that these examples are provided for illustrative purposes and are not to be construed as limiting the scope of the present disclosure.

EXAMPLES

Example 1

Different B vitamins and B vitamin derivatives were used to generate several aqueous formulations. Each B vitamin or B vitamin derivative was dissolved in water. The absorbance behavior was then measured, and the results are shown in Table 1.

TABLE 1

| Formulation ID | B Vitamin or B Vitamin Derivative | Peak Wavelength(s) (nm) | Absorbance (AU) |
| --- | --- | --- | --- |
| 1 | Riboflavin | 375, 450 | 0.5, 0.65 |
| 2 | Folic acid | 365 | 0.31 |
| 3 | Cyanocobalamin | 360 | 0.73 |
| 4 | Pyridoxal phosphate | 390 | 0.45 |
| 5 | Pyridoxal HCl | 325 | 0.88 |
| 6 | Pyridoxine HCl | 330 | 0.45 |

As depicted, each of the B vitamins and B vitamin derivatives exhibited absorption within the wavelength range from 325 nm to 450 nm. Based on these results, UV LED radiation sources with emission at 365 nm or 395 nm may be suitable for use during 3D printing with most of the B vitamins and B vitamin derivatives. When either a 365 nm or 395 nm UV LED radiation source is to be used with a fusing agent containing pyridoxal HCl or pyridoxine HCl, it may be desirable add an additional B vitamin or a B vitamin derivative that has a peak absorption at a wavelength higher than 350 nm to the fusing agent. Alternatively, increased UV intensity and/or UV dose may be used for fusing agents containing pyridoxal HCl or pyridoxine HCl.

Example 2

Example UV light fusing agents were prepared with two different types of aqueous vehicles. The formulations of the example agents are shown in Tables 2 and 3.

TABLE 2

| Ingredient Type | Specific Component | Example 1 UVFA (wt % active) | Example 2 UVFA (wt % active) |
|---|---|---|---|
| B vitamin or B vitamin derivative | Folic Acid | 2.5 | — |
| | Pyridoxal HCl | — | 5.0 |
| Co-solvent | 2-pyrrolidone | 25 | 25 |
| Anti-Kogation Agent | CRODAFOS ® O3A | 0.45 | 0.45 |
| Antimicrobial Agent | ACTICIDE ® B20 | 0.04 | 0.04 |
| | ACTICIDE ® M20 | 0.015 | 0.015 |
| Surfactant | TEGOWET ® 510 | 0.75 | 0.75 |
| Chelating Agent | TRILON ® M | 0.08 | 0.08 |
| Water | Deionized water | Balance | Balance |

TABLE 3

| Ingredient Type | Specific Component | Example 3 UVFA (wt % active) | Example 4 UVFA (wt % active) | Example 5 UVFA (wt % active) |
|---|---|---|---|---|
| B vitamin or B vitamin derivative | Folic Acid | 2.0 | — | — |
| | Pyridoxal Phosphate | — | 2.0 | — |
| | Cyanocobalamin | — | — | 2.0 |
| Co-solvent | PEG 300 | 1-15 | 1-15 | 1-15 |
| | Glycerol | 1-15 | 1-15 | 1-15 |
| Preservative | 2-phenoxyethanol | 0.1-2 | 0.1-2 | 0.1-2 |
| pH Adjuster | Taurine | 0.01 to 1 | 0.01 to 1 | 0.01 to 1 |
| Surfactant | Sodium Docusate | 0.1 to 2 | 0.1 to 2 | 0.1 to 2 |
| | Sodium Dodecyl Sulfate | 0.1 to 2 | 0.1 to 2 | 0.1 to 2 |
| Base | Potassium Hydroxide | 1.0 | 2.0 | — |
| Water | Deionized water | Balance | Balance | Balance |

The example UV light fusing agents were used to generate single 3D printed layers.

In some examples, the polymeric build material was polyamide-12 and in other examples, the polymeric build material was polypropylene. The build material was spread out into thin layers. The respective example UV light fusing agents were inkjet printed in a rectangular pattern on the different build material layers. The fusing agent loading was approximately 1 drop per pixel (dpp) or 2 drop per pixels.

The patterned build material layers were maintained at room temperature and were exposed to UV radiation (395 nm, intensity=12 $W/cm^2$ or 10.8 $W/cm^2$) for times ranging from 0.5 seconds to 2 seconds. All of the patterned areas formed 3D printed object layers, while the non-patterned areas remained as non-coalesced powder. The 3D printed object layers are identified in Table 4 by the type of polymeric build material used, the fusing agent used, the fusing agent loading, and the UV exposure conditions.

TABLE 4

| 3D Printed Object Layer | Build Material | Example UVFA | Example UVFA Loading | UV Radiation Intensity | UV Exposure Time |
|---|---|---|---|---|---|
| 1 | polyamide-12 | 1 | 2 dpp | 12 $W/cm^2$ | 1 second |
| 2 | polyamide-12 | 2 | 2 dpp | 12 $W/cm^2$ | 2 seconds |
| 3 | polypropylene | 1 | 1 dpp | 12 $W/cm^2$ | 1 second |
| 4 | polyamide-12 | 3 | 1 dpp | 12 $W/cm^2$ | 0.5 seconds |
| 5 | polyamide-12 | 4 | 1 dpp | 12 $W/cm^2$ | 0.5 seconds |
| 6 | polyamide-12 | 5 | 2 dpp | 10.8 $W/cm^2$ | 0.8 seconds |

Figure 4A:
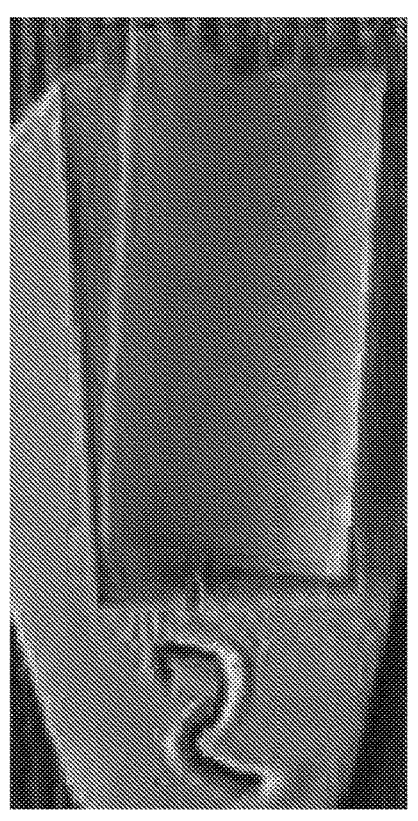
FIGS. 4A through 4F are black and white reproductions of originally colored photographs of example 3D object layers formed with different examples of the UV light fusing agents.
Figure 4B:
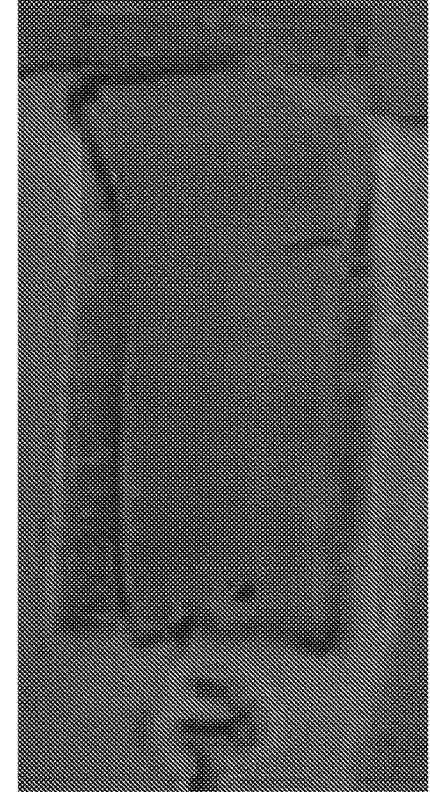
Figure 4C:
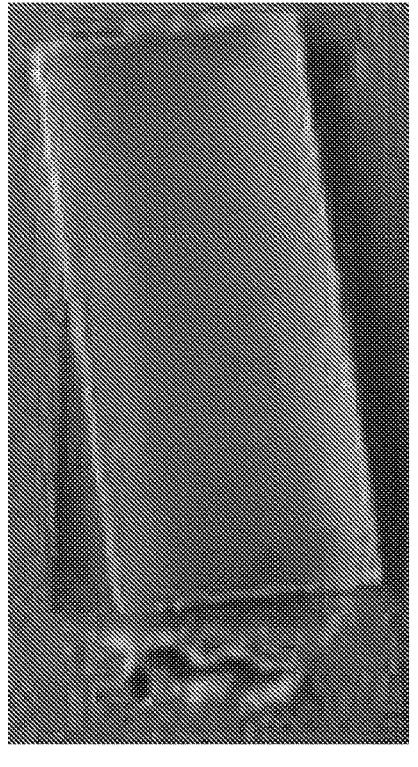
Figure 4D:
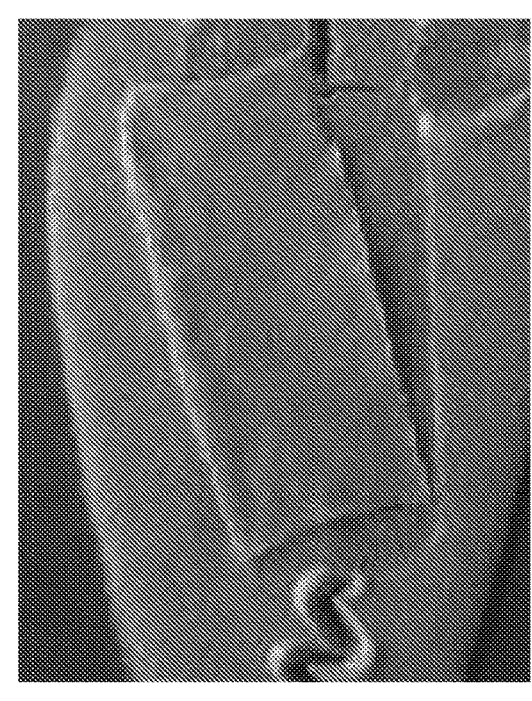
Figure 4E:
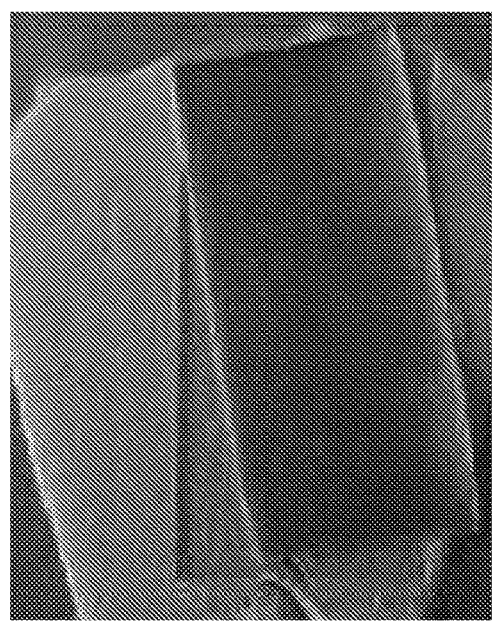
Figure 4F:
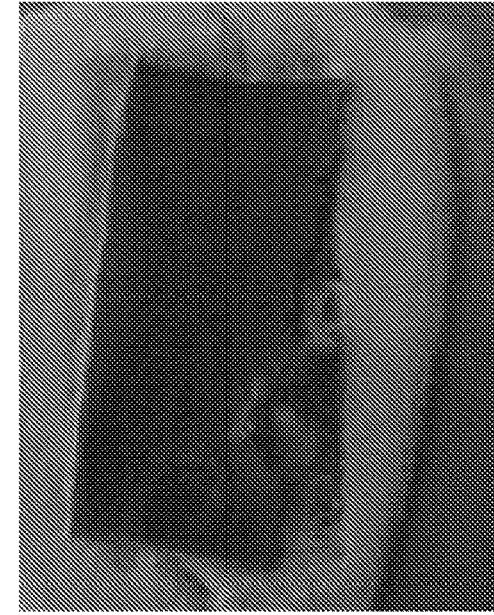

Photographs were taken of the resulting 3D printed object layers as well as the non-patterned build material surrounding the 3D printed object layer. These photographs are reproduced herein in black and white in FIG. 4A through FIG. 4E, where FIG. 4A shows 3D printed object layer 1 (originally yellow-light brown in color), FIG. 4B shows 3D printed object layer 2 (originally off-white in color), FIG. 4C shows 3D printed object layer 3 (originally yellow-light brown in color), FIG. 4D shows 3D printed object layer 4 (originally yellow in color), FIG. 4E shows 3D printed object layer 5 (originally light brown in color), and FIG. 4F shows 3D printed object layer 6 (originally pink-light brown in color).

Overall, the 3D printed object layers were continuous, well fused layers. As illustrated in the figures, each of the 3D object layers was moved from its original position, indicating that the 3D object layers were also mechanically strong. These results indicate that the fusing agent vehicles did not affect the absorption of the various B vitamins or B vitamin derivatives.

Example 3D object layer 2, formulated with Example 2 UVFA (with Pyridoxal HCl as the B vitamin derivative), exhibited the poorest coalescence. This was likely due to the B vitamin derivative having weaker absorption at 395 nm (see Table 1) than the other B vitamins or B vitamin derivatives used in this example.

Each of FIG. 4A through FIG. 4E also depicts a scratch (or a portion of a scratch) in the non-patterned build material. This scratch was made to show that the non-patterned build material did not coalesce like the patterned build material. Additionally, it was observed that there was no change (e.g., in color) in the non-patterned build material. This indicated that the build material was not deleteriously affected by the UV exposure.

Example 3

Two different UV light fusing agents were used in this example to illustrate that the extent of fusing/coalescence can be altered by changing the UV exposure conditions. In this example, Example 1 UVFA (including folic acid, see Table 2) from Example 2 was utilized. An additional fusing agent was also prepared with folic acid. The formulation of this additional fusing agent is shown in Table 5.

TABLE 5

| Ingredient Type | Specific Component | Example 6 UVFA (wt % active) |
|---|---|---|
| B vitamin | Folic Acid | 2.5 |
| Co-solvent | PEG 300 | 1-15 |
| | Glycerol | 1-15 |
| Preservative | 2-phenoxyethanol | 0.1-2 |
| pH Adjuster | Taurine | 0.01 to 1 |
| Surfactant | Sodium Docusate | 0.1 to 2 |
| | Sodium Dodecyl Sulfate | 0.1 to 2 |
| Base | Potassium Hydroxide | 1.0 |
| Water | Deionized water | Balance |

Example 1 UVFA and Example 6 UVFA were used to generate single 3D printed layers. In this example, the polymeric build material was polyamide-12. The build material was spread out into thin layers. The respective example UV light fusing agents were inkjet printed in a rectangular pattern on the different build material layers. The fusing agent loading was 2 dpp. The patterned build material layers were maintained at room temperature and were exposed to UV radiation (395 nm) with the same intensity (12 W/cm$^2$) for different times ranging from 0.4 seconds to 1 second. The 3D printed object layers are identified in Table 6 by the fusing agent and the UV exposure time.

TABLE 6

| 3D Printed Object Layer | Example UVFA | UV Exposure Time |
|---|---|---|
| 7 | 1 | 1 second |
| 8 | 1 | 0.8 seconds |
| 9 | 1 | 0.6 seconds |
| 10 | 1 | 0.4 seconds |
| 11 | 6 | 1 second |
| 12 | 6 | 0.8 seconds |
| 13 | 6 | 0.6 seconds |
| 14 | 6 | 0.4 seconds |

Photographs were taken of the resulting 3D printed object layers as well as the non-patterned build material surrounding the 3D printed object layer. FIG. 5A through FIG. 5D respectively show 3D printed objects layers 7-10, and FIG. 6A through FIG. 6D respectively show 3D printed objects layers 11-14. Table 7 provides the color of the 3D printed object layers.

TABLE 7

| 3D Printed Object Layer | Object Color |
|---|---|
| 7 | Yellow-light brown |
| 8 | Yellow |
| 9 | Light yellow |
| 10 | Light yellow |
| 11 | Brown |
| 12 | Yellow-brown |
| 13 | Yellow-light brown |
| 14 | Yellow |

Figure 5A:
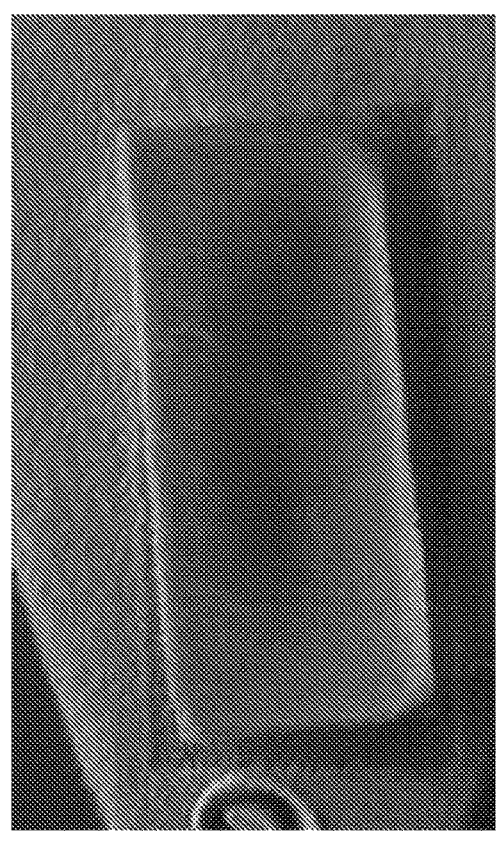
FIGS. 5A through 5D are black and white reproductions of originally colored photographs of example 3D object layers formed with the same UV light fusing agent (including folic acid and one type of aqueous vehicle) and UV intensity, but at different UV exposure times.
Figure 5B:
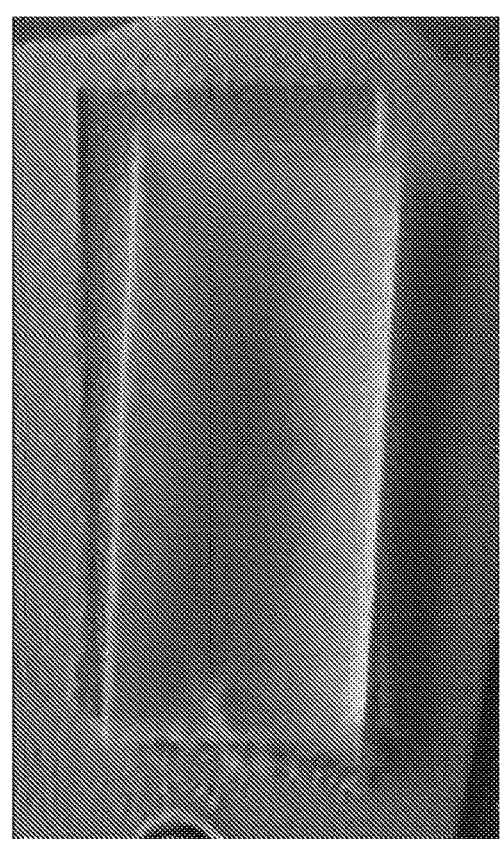
Figure 5C:
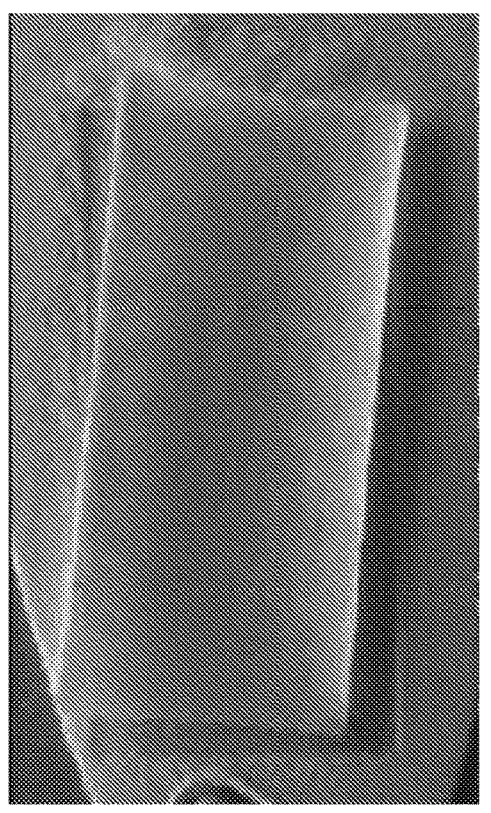
Figure 5D:
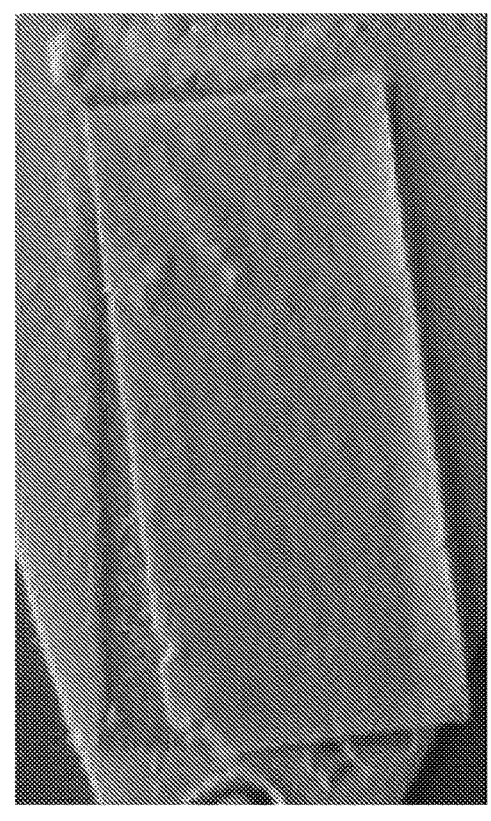
Figure 6A:
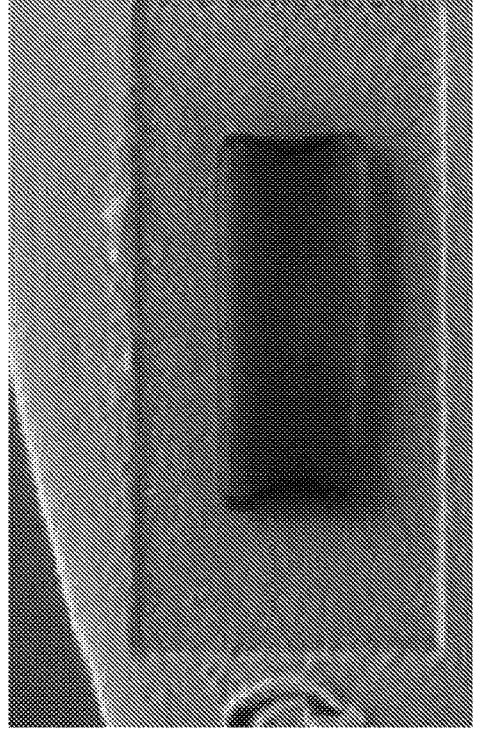
FIGS. 6A through 6D are black and white reproductions of originally colored photographs of example 3D object layers formed with the same UV light fusing agent (including folic acid and another type of aqueous vehicle) and UV intensity, but at different UV exposure times.
Figure 6B:
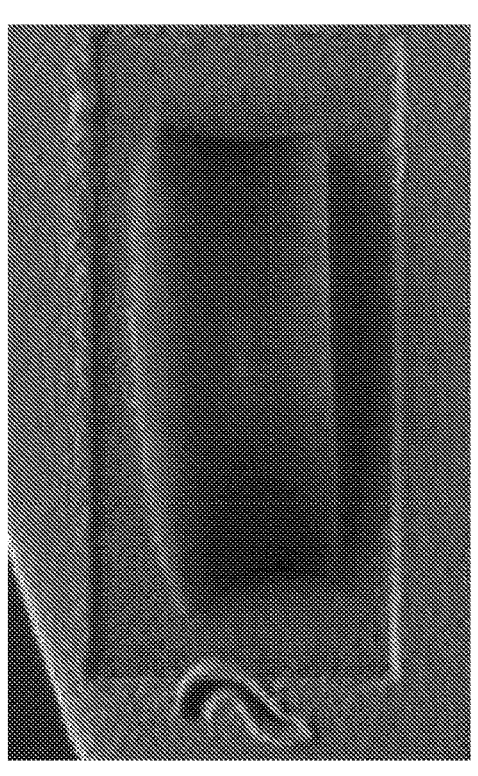
Figure 6C:
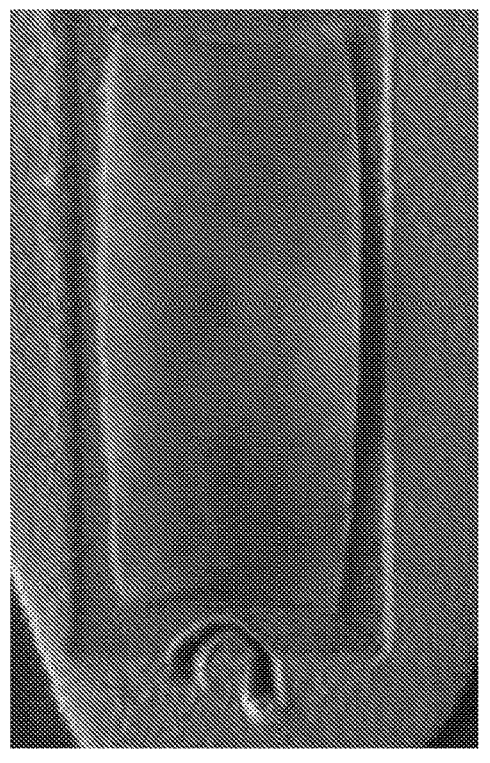
Figure 6D:
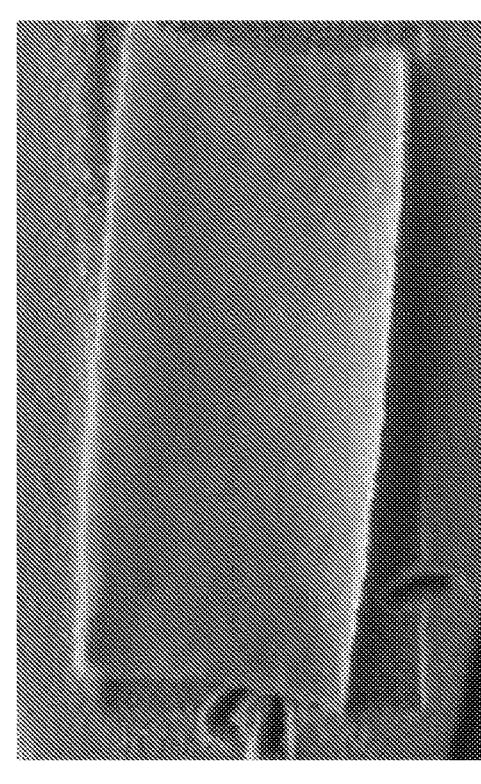
Figure 7A:
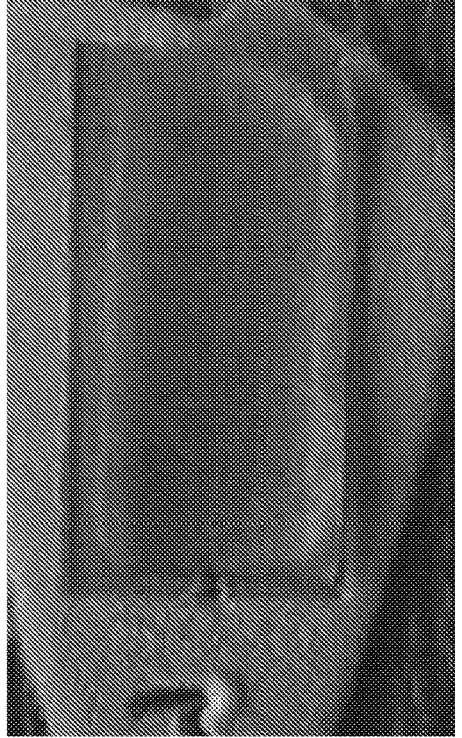
FIGS. 7A through 7D are black and white reproductions of originally colored photographs of, respectively, example 3D objects formed with the same UV light fusing agent (including folic acid and one type of aqueous vehicle) but at different UV intensities for 1 or 2 second UV exposure times.
Figure 7B:
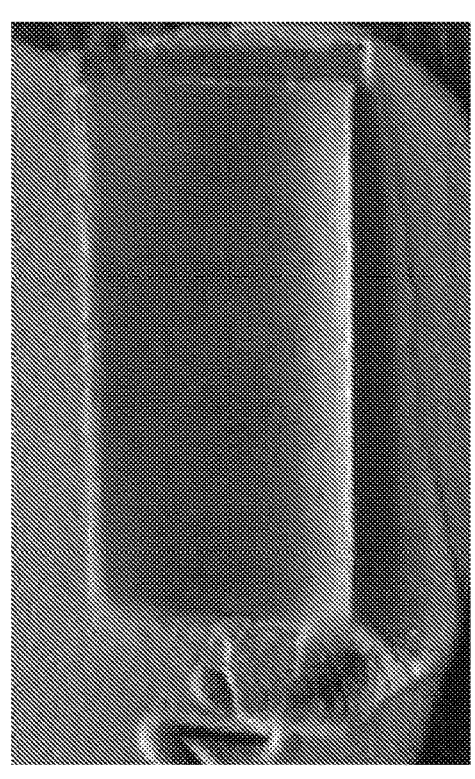
Figure 7C:
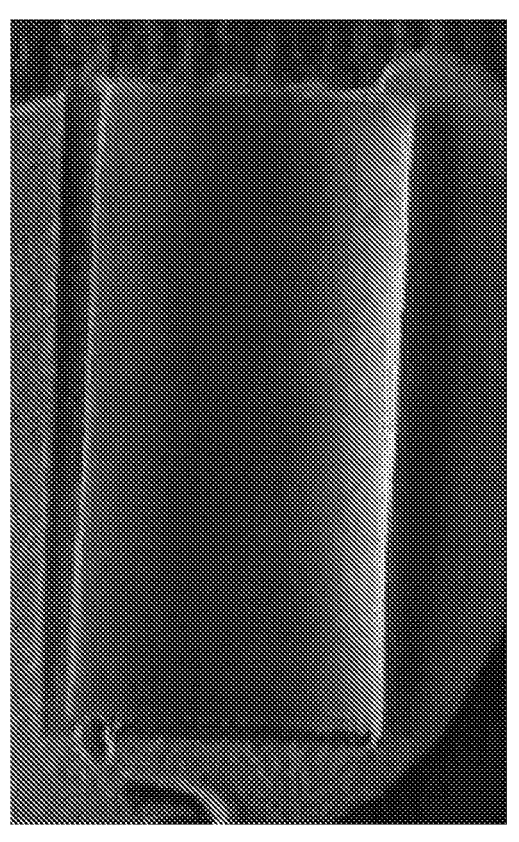
Figure 7D:
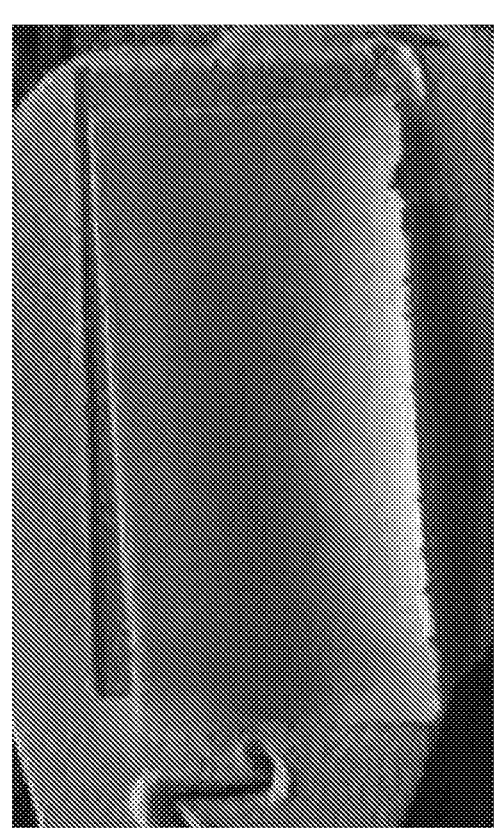

Comparing FIG. 5A with FIG. 5D and FIG. 6A with FIG. 6D, it is clear that a higher UV exposure time can lead to over fused parts. At a higher vitamin B loading (e.g., 2 dpp)

and a higher UV intensity (12 W/cm$^2$), the exposure time may be lowered in order to achieve well fused, but not over fused, 3D objects.

Example 4

Any of the following parameters, e.g., the UV irradiation intensity, vitamin B/vitamin B derivative loading, and/or the exposure time, may be adjusted for the particular vitamin B/vitamin B derivative being used. The absorption characteristics of the vitamin B/vitamin B derivative may be taken into account in order to tweak the parameters and achieve well fused 3D objects. Four additional 3D object layers were printed with Example 1 UVFA to illustrate this point.

For the four additional 3D object layers, example 1 UVFA was inkjet printed in a rectangular pattern on polyamide 12 build material layers. The fusing agent loading was 2 dpp. The patterned build material layers were maintained at room temperature and were exposed to UV radiation (395 nm) at different intensities and for the same or different times. The additional 3D printed object layers are identified in Table 8 by the UV intensity and the UV exposure time.

TABLE 8

| 3D Printed Object Layer | UV Intensity | UV Exposure Time |
|---|---|---|
| 15 | 12 W/cm$^2$ | 1 second |
| 16 | 10.8 W/cm$^2$ | 2 seconds |
| 17 | 9.6 W/cm$^2$ | 2 seconds |
| 18 | 8.4 W/cm$^2$ | 2 seconds |

Photographs were taken of the resulting 3D printed object layers as well as the non-patterned build material surrounding the 3D printed object layer. FIG. 7A through FIG. 7D respectively shows 3D printed objects layers 15-18. The color of each 3D printed objects layers 15-18 was, respectively, off-white, light yellow, light yellow-light brown, and light yellow. Each of these 3D object layers was well fused, without being over fused. By lowering the time when using a higher UV intensity (FIG. 7A) or by increasing the time when using lower UV intensities (FIG. 7B through FIG. 7D), the extent of fusing/coalescence can be well controlled to develop aesthetically pleasing and mechanically strong 3D printed parts.

The color of 3D object layer 15 (FIG. 7A) was off-white. The color may be modulated by using a lower concentration of the folic acid. The lower concentration can still generate a well fused 3D object layer, e.g., by heating the powder prior to and during UV exposure and/or by increasing the intensity of the UV source.

Overall, the 3D printed object layers generated in Examples 2-4 were continuous, well fused layers. These results indicated that the various B vitamins and B vitamin derivatives are suitable UV absorbers for 3D printing fusing agents.

Moreover, in Examples 2-4, it was also noted that all of the example fusing agents exhibited reliable inkjet printing, e.g., in terms of decap, nozzle health, etc.

It is to be understood that the ranges provided herein include the stated range and any value or sub-range within the stated range, as if that value or sub-range were explicitly recited. For example, from about 1 wt % to about 5 wt % should be interpreted to include not only the explicitly recited limits of from about 1 wt % to about 5 wt %, but also to include individual values, such as about 1.25 wt %, about 2 wt %, about 3.7 wt %, about 4 wt %, etc., and sub-ranges, such as from about 1.5 wt % to about 4.5 wt %, from about 1 wt % to about 3.5 wt %, from about 2.4 wt % to about 5 wt %, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A kit for three-dimensional (3D) printing, the kit comprising:
an ultraviolet (UV) light fusing agent including:
an aqueous solution vehicle including a co-solvent, a surfactant, water, and a B vitamin or a B vitamin derivative, the B vitamin or the B vitamin derivative having absorption at wavelengths ranging from about 340 nm to about 415 nm,
wherein the B vitamin or B vitamin derivative is selected from the group consisting of folic acid, cyanocobalamin, pantothenic acid, biotin, pyridoxine, and combinations thereof.

2. The kit as defined in claim 1 wherein the B vitamin or the B vitamin derivative is present in an amount ranging from about 2 wt % to about 5 wt % based on a total weight of the UV light fusing agent.

3. The kit as defined in claim 1 wherein the UV light fusing agent further comprises a base.

4. The kit as defined in claim 1 wherein the UV light fusing agent excludes a polymeric molecule bearing an adhesive moiety.

5. The kit as defined in claim 1 wherein the UV light fusing agent further comprises an additive selected from the group consisting of an anti-kogation agent, a chelating agent, an anti-microbial agent, a buffer, and combinations thereof.

6. The kit as defined in claim 1 wherein the UV light fusing agent further comprises an additive selected from the group consisting of a pH adjuster, a preservative, and combinations thereof.

7. The kit as defined in claim 1, further comprising a detailing agent including a second aqueous vehicle and excluding an absorber having absorption at wavelengths ranging from about 340 nm to about 415 nm.

8. The kit as defined in claim 1, further comprising a colored ink.

9. A method for three-dimensional (3D) printing, the method comprising:
applying a polymeric build material composition to form a build material layer;
based on a 3D object model, selectively applying an ultraviolet (UV) light fusing agent on at least a portion of the build material layer, the UV light fusing agent including:
an aqueous solution of a co-solvent, a surfactant, and water, and
a B vitamin or the B vitamin derivative, the B vitamin or the B vitamin derivative having absorption at wavelengths ranging from about 340 nm to about 415 nm,
wherein the B vitamin or B vitamin derivative is selected from the group consisting of folic acid, cyanocobalamin, pantothenic acid, biotin, pyridoxine, and combinations thereof; and
exposing the build material layer to UV radiation to coalesce the at least the portion to form a layer of a 3D object.

10. The method as defined in claim 9, further comprising:
iteratively applying the polymeric build material composition to form respective build material layers;
selectively applying the UV light fusing agent on the respective build material layers to form respective patterned portions; and
exposing the respective build material layers to UV radiation.

11. The method as defined in claim 9 wherein the B vitamin or the B vitamin derivative is present in an amount ranging from about 2 wt % to about 5 wt % based on a total weight of the UV light fusing agent.

12. The kit as defined in claim 1 wherein the aqueous solution includes from about 2 wt % active to about 15 wt % active of the co-solvent and from 50 wt % to 90 wt % of the water.

* * * * *